United States Patent [19]

Blum et al.

[11] Patent Number: 4,613,639
[45] Date of Patent: Sep. 23, 1986

[54] PREPARATION OF PLASTISOLS AND ORGANOSOLS HAVING A LONG SHELF LIFE

[75] Inventors: Rainer Blum, Ludwigshafen; Rolf Osterloh, Gruenstadt, both of Fed. Rep. of Germany

[73] Assignee: BASF Aktiengesellschaft, Ludwigshafen, Fed. Rep. of Germany

[21] Appl. No.: 790,800

[22] Filed: Oct. 24, 1985

Related U.S. Application Data

[63] Continuation of Ser. No. 587,044, Mar. 7, 1984, abandoned.

[30] Foreign Application Priority Data

Mar. 12, 1983 [DE] Fed. Rep. of Germany ....... 3308925

[51] Int. Cl.$^4$ .......................... C08K 5/17; C08K 5/12; C08L 33/02; C08L 33/04
[52] U.S. Cl. .................................. 524/251; 524/252; 524/502; 524/507; 524/514; 524/556; 524/559
[58] Field of Search ............... 524/514, 251, 252, 507, 524/502, 556, 559

[56] References Cited

U.S. PATENT DOCUMENTS

| 2,385,920 | 10/1945 | Jenkins | 524/514 |
|---|---|---|---|
| 3,875,262 | 4/1975 | Milne | |
| 4,071,653 | 1/1978 | Boessler et al. | 428/332 |
| 4,125,700 | 11/1978 | Graham | 526/317 |
| 4,176,028 | 11/1979 | Graham | 204/159.16 |
| 4,199,486 | 4/1980 | Boessler | 525/309 |
| 4,210,567 | 7/1980 | Kosters | 521/73 |
| 4,309,331 | 1/1982 | Graham | 428/402 |
| 4,558,084 | 12/1985 | Quis | 524/559 |

FOREIGN PATENT DOCUMENTS

| 0030590 | 2/1983 | European Pat. Off. . |
| 2454235 | 5/1976 | Fed. Rep. of Germany . |
| 2529732 | 1/1977 | Fed. Rep. of Germany . |
| 2543542 | 6/1977 | Fed. Rep. of Germany . |
| 2722752 | 2/1980 | Fed. Rep. of Germany . |
| 2928928 | 1/1981 | Fed. Rep. of Germany . |
| 2812014 | 10/1981 | Fed. Rep. of Germany . |
| 2812015 | 10/1981 | Fed. Rep. of Germany . |
| 2812016 | 10/1981 | Fed. Rep. of Germany . |
| 2949954 | 2/1983 | Fed. Rep. of Germany . |
| 1156668 | 12/1957 | France . |
| 1027974 | 5/1966 | United Kingdom . |
| 1598579 | 9/1981 | United Kingdom . |

*Primary Examiner*—C. Warren Ivy
*Attorney, Agent, or Firm*—Keil & Weinkauf

[57] ABSTRACT

Plastisols and organosols which have a long shelf life at room temperature, are based on a mixture of a finely divided synthetic resin with a plasticizer and may or may not contain additional pigments, fillers, volatile organic solvents and other assistants are prepared by a process in which an inert or reactive protective colloid or emulsifier, or a mixture of these, is added to a dispersion of a finely divided synthetic resin in a plasticizer, the dispersion as such not having a long shelf life at room temperature.

These plastisols can be used as coating materials, sealants and adhesives.

6 Claims, No Drawings

PREPARATION OF PLASTISOLS AND ORGANOSOLS HAVING A LONG SHELF LIFE

This application is a continuation of application Ser. No. 587,044, filed on Mar. 7, 1984, now abandoned.

The present invention relates to a process for the preparation of dispersions of finely divided synthetic resins in plasticizers, ie. plastisols and organosols, which have a long shelf life.

Plastisols are two-phase systems comprising plastic or synthetic resin particles and a plasticizer, the stated particles constituting the inner phase and the plasticizer the outer continuous phase of a dispersion.

An essential feature of the plastisols is that, under conventional storage conditions close to room temperature, phase separation is retained to such an extent that the material is a free-flowing dispersion. The consistency of the dispersions can range from thinly fluid to pasty. Another essential feature of the plastisols is that heating converts them into a non-free-flowing state which can range from brittle to resilient, flexible and tacky.

The specialist term for this change of state is gelling.

In this process, the plastic or synthetic resin particles absorb the plasticizer until they come into contact with one another and stick together. This change of state is irreversible even on cooling.

The gelled plastisols may then be homogeneous materials or, if the plasticizer has not uniformly penetrated the plastic particles, may also possess certain inhomogeneities, without their usefulness being restricted as a result. Plasticizers are any liquids which, in conjunction with a plastic or synthetic resin, satisfy the conditions for a plastisol; very low volatility is important, since otherwise the plasticizer would gradually escape during storage of the gelled plastisols, and undesirable changes in the properties would result.

Industrially important liquids which satisfy the conditions for the plasticizers and are widely used are the esters of phthalic, adipic, sebacic and phosphoric acid, chlorohydrocarbons, liquid polyesters and epoxidized natural oils, such as linseed oil or soybean oil.

Detailed definitions of the term plasticizer and of the physicochemical interaction between the plasticizer and the plastic or synthetic resin particles are given by K. Weinmann in "Beschitchten mit Lacken and Kunststoffen" (Verlag W. A. Colomb, Stuttgart 1967), pages 47–158.

In order to regulate the processing properties, certain amounts of volatile solvents can be added to the plastisols. Where more than about 5–10% of volatile solvents are present, the plastisols are also referred to as organosols, although the boundaries between plastisols and organosols are not sharply defined (cf. H. A. Sarvertnick, "Plastisols and Organosols", von Nostrand Reinhold Company, New York 1972, page 201, and K. Weinmann, "Beschichten mit Lacken and Kunststoffen", Verlag W. A. Colomb, Stuttgart 1967, page 21).

In principle, any polymeric resin can be converted to a plastisol by suitable choice of the components. In practice, both industrial use and the technical literature have concentrated virtually exclusively on the use of polyvinyl chloride for the formation of plastisols, the extent of the concentration being such that under the term plastisol in Chemical Abstracts reference is made to polyvinyl chloride, and in many specialist books plastisols are described as suspensions of polyvinyl chloride resin.

This dominating position of polyvinyl chloride (PVC) in the industrial and technical plastisol fields is based on the fact that for a large number of polymers with otherwise extremely advantageous and desirable properties it is impossible to find suitable plasticizers because either dispersions of unsuitable viscosity and shelf life are obtained, or the plasticizers are exuded from the gelled plastisols.

It is particularly desirable to be able to use the resins based on acrylate and vinyl ester polymers and copolymers for plastisols, since they exhibit a large number of advantages compared with PVC; for example, because the monomers can be chosen freely, the properties of the copolymers can be varied over a wide range. A very substantial disadvantage of PVC, which is not possessed by the acrylate and vinyl polymers, is its instability; this leads to embrottlement, elimination of hydrochloric acid and discoloration, and necessitates the presence of stabilizers, some of which are highly toxic, eg. lead and cadmium compounds.

The desire to formulate acrylate plastisols has led to a number of patent applications over the past few years. German Pat. Nos. 2,454,235 and 2,529,732 attempt to solve the problem by using acrylate polymers having a glass transition temperature >35° and coordinating the glass transition temperature, the particle size and the composition of the dispersed polymer particles and special plasticizer mixtures. However, this provides only a partial solution to the problem, and the object is regarded as having been achieved if the viscosity of the plastisols does not increase by more than a factor of 3 in the course of eight days.

U.S. Pat. No. 4,071,653 and German Pat. Nos. 2,543,542, 2,722,752 and 2,949,954 describe methacrylate particles which have a special structure and, because they are composed of a core which is particularly compatible with the plasticizer, and a shell which is poorly compatible with the plasticizer, give plastisols which have a long shelf life in both the liquid and the gelled states. U.S. Pat. No. 4,176,028, British Pat. Nos. 1,598,589 and 1,598,579, and German Pat. Nos. 2,812,014, 2,812,015 and 2,812,016 describe the use of polymeric salts of acrylic or methacrylic acid, these being referred to as polyelectrolytes in the stated patents.

A feature of all these attempts to convert acrylate polymers to plastisols is the fact that they depend on a very special choice of raw materials, with the result that the usefulness of the resulting dispersions, or of the plastigels obtained from these by gelling, is restricted.

It is an object of the present invention to avoid these disadvantages and, with a substantially free choice of polymer composition and of plasticizer, to obtain plastisols which have a long shelf life at room temperature.

We have found that this object is achieved, and that, surprisingly, it is possible, within the framework of the above general conditions for plastisols and organosols, freely to combine synthetic resins, eg. vinyl ester, acrylate or methacrylate copolymers, and plasticizers to give plastisols and organosols, and that this can be done by stabilizing the dispersions with protective colloids under conventional storage conditions close to room temperature, with the proviso that the stabilization is terminated during gelling at elevated temperatures, and the protective colloids used as stabilizers are integrated in the resulting plastigel.

The present invention relates to a process for the preparation of plastisols which have a long shelf life at room temperature, are based on a mixture of a finely divided synthetic resin with a plasticizer and may or may not contain additional pigments, fillers, volatile organic solvents and other assistants, wherein an inert and/or reactive protective colloid or emulsifier, or a mixture of these, is added to a dispersion of a finely divided synthetic resin in a plasticizer, the dispersion as such not having a long shelf life at room temperature, and a dispersion which has a long shelf life at room temperature is thus obtained.

The dispersions according to the invention can contain, as finely divided synthetic resins, copolymers of acrylic or methacrylic compounds, for example those which are predominantly composed of copolymerized units of acrylates, methacrylates and/or acrylonitrile, where these acrylic or methacrylic compounds can be partially replaced by other acrylate or methacrylate monomers, vinylaromatics or minor amounts of other olefinically unsaturated monomers which are copolymerizable with acrylates and methacrylates, or can contain, as finely divided synthetic resins, vinyl ester copolymers.

The finely divided synthetic resins used according to the invention may also contain mixtures of acrylate or methacrylate copolymers and vinyl ester copolymers, and these synthetic resins alone, without the addition of dispersion stabilizers, form, with plasticizers, dispersions which are unstable or have only a short shelf life.

Other suitable finely divided synthetic resins are those which contain acidic groups, preferably carboxyl groups, and have an acid number of not less than 5, basic protective colloids and/or basic emulsifiers being used as dispersion stabilizers.

Further suitable finely divided synthetic resins are those which contain basic groups and have an amine number of not less than 5, acidic protective colloids and/or acidic emulsifiers being used as dispersion stabilizers.

The plastisols and organosols prepared by the novel process contain finely divided synthtic resins having a particular composition, protective colloids, plasticizers and, in the case of organosols, also volatile solvents.

For the purposes of the present invention, finely divided synthetic resins are in general plastic or synthetic resin particles from 0.05 to 500 $\mu m$ in size. The particle size (expressed as the mean particles diameter) is not critical but for conventional practical use is preferably from 0.1 to 20, in particular from 0.5 to 10, $\mu m$. The desired particle size in a given case is determined partly by the properties desired for the end product and by the shaping method to be used. Although very small particles of, for example, less than 0.1 $\mu m$ are suitable, because of their large surface they require large amounts of plasticizer to obtain, for example, a desired low viscosity. This may lead to a disadvantageous ratio of polymer to plasticizer in the gelled product.

Very large particles may restrict the minimum thickness of coatings which can be prepared from dispersions containing these particles. Furthermore, the time taken for melting or flowing together may be so long as to be of no practical use and/or disadvantageous. Particle sizes within the desired range in a given case can be obtained either directly by choosing a suitable polymerization method, or by milling large particles to form smaller particles in, a conventional apparatus and using a conventional method.

Regarding the components of the dispersions prepared according to the invention, the following may be stated specifically:

The finely divided synthetic resins are in general homopolymers and/or copolymers based on polymerizable unsaturated monomers.

In general, particular terms, such as vinylic, acrylic, allylic, olefinic and the like are used to describe unsaturated monomers, depending on the position of the polymerizable bond in the molecule.

The possibility of preparing copolymers based on different monomers of these types is governed by the copolymerization parameters (cf. for example J. Polymer Sci. 54 (1961), 411–455).

The monomers from which the plastic particles suitable for preparing the novel plastisols are produced are chosen on the basis of these preconditions, and of the properties desired for the end product obtained from the plastisol by gelling.

It is particularly advantageous if the novel plastisols are prepared using synthetic resins which contain acidic or basic groups in the polymer molecule.

Preferred acidic groups are carboxyl groups, while referred basic groups are primary, secondary and tertiary amino groups. The acidic or basic groups can be introduced by copolymerization of acidic or basic monomers with other monomers, by chemical conversion of acid-free or base-free polymers, or by a combination of these two methods.

Examples of acidic monomers are olefinically unsaturated mono- and dicarboxylic acids and the monoesters of these dicarboxylic acids with alcohols of 1 to 20 carbon atoms. Examples of acidic polymerizable monomers which are readily available industrially and are therefore preferred are acrylic acid, methacrylic acid, maleic acid and half esters of maleic acid with alcohols of 1 to 20, preferably 2 to 8, carbon atoms.

Examples of basic copolymerizable monomers are the esters of acrylic acid and methacrylic acid with alkanolamines of 1 to 20 carbon atoms.

Examples of compounds of this type which are readily available industrially and are preferred are diethylaminoethyl acrylate and methacrylate and dimethylaminoethyl acrylate and methacrylate.

Examples of polymer-analogous reactions by means of which carboxyl groups can be introduced into carboxyl-free polymers are the reactions of dicarboxylic anhydride groups present in the copolymer with an alcohol or water. Polymers containing dicarboxylic anhydride groups are obtained by, for example, copolymerization of maleic anhydride with comonomers suitable for the copolymerization, taking into account the copolymerization parameters.

Examples of polymer-analogous reactions by means of which basic groups can be introduced into the polymers are the hydrazinolysis of polyacrylates, as described in Organic Coatings + Applied Polymer Science 46, 1982, and the amidation of carboxyl-containing polymers, as described in German Laid-Open Application DOS 3,043,355.

The glass transition temperature (Tg) of the polymer particles is not a critical parameter with regard to the preparation of the novel plastisols. However, because an amount of plasticizer of about $\geq 30\%$ is required for the preparation of plastisols which exhibit flow and can be applied with a knife coater, polymers having a Tg of $<80°$ C. generally do not give non-tacky plastigels.

For certain applications, eg. adhesives and sealants, where it is desirable for the end products to be tacky, polymers having a Tg of about <80° C. may, however, be advantageous, ie. regarding the Tg of the polymer particles, the choice depends on the properties desired for the end product and on its use.

The finely divided synthetic resins can be prepared by a conventional method, for example by mass, emulsion, suspension or precipitation polymerization.

A preferred method for preparing finely divided synthetic resins is polymerization in aqueous dispersion, followed by vaporization of the water by spray drying. This method is in general useful only if the glass transition temperature of the polymer is sufficiently high. Polymers having a low glass transition temperature can also be obtained from dispersions, for example by precipitation or freeze drying, and the resulting particles can be prevented from sticking together by the addition of suitable assistants, eg. talc or finely divided silica.

The present invention does not relate to the preparation, chemical composition, particle shape, particle size and particle size distribution of the acrylate polymer particles used in the novel plastisols and organosols, but does relate to the method for processing these particles with the aid of a protective colloid to give dispersions which have a long shelf life at room temperature.

The plasticizers used in the novel dispersions are liquids which conform to the abovementioned conditions for plasticizers.

A large number of plasticizers in common use industrially are described by F. Stuhlen and L. Meier in "Kunststoff-Rundschau", 1972, pages 257–260 and 316–319, by K. Weinmann in "Beschichten mit Lacken und Kunststoffen", by W. A. Colomb, Verlag Stuttgart 1967, pages 24–158, and by H. Kittel in "Lehrbuch der Lacke und Beschichtungen" (W. A. Colomb, Berlin 1976), Volume IV, pages 301–320.

Information on the function and type of the reactive plasticizers is also given in the above publications. Examples of conventional reactive plasticizers are allyl esters of mono- and polycarboxylic acids, acrylates and methacrylates of monohydric and polyhydric alcohols, and mono- and polyepoxides, eg. epoxidized castor oil.

Plastisols or organosols which as such do not have a long shelf life at room temperature are stabilized by the use of reactive and inert protective colloids or appropriate emulsifiers, this stabilization being an essential feature of the invention.

Protective colloids are relatively high molecular weight substances which display a phase-separating surfactant activity between the continuous and the discontinuous phase of a dispersion. Emulsifiers or soaps are relatively low molecular weight compounds which occupy the surfaces of the disperse phases.

More detailed definitions of the terms protective colloid and soap can be found in, for example, B. Vollmert, Polymer Chemistry, Springer-Verlag, Heidelberg 1973, page 151 et seq.

For the purposes of the present invention, reactive protective colloids are preferably protective colloids and emulsifiers which are capable of reacting with the acidic or basic groups of the polymer particles of the plastisols or organosols, and therefore undergo addition at the surface of the polymer particles. Adduct formation by the protective colloids and emulsifiers can occur as a result of polar interactions, hydrogen bonding, ionic bonds and primary valency bonds.

The protective colloids or emulsifiers which have undergone addition at the surface of the polymer particles form a protective coating which stabilizes the particles although they are soluble or swellable in the plasticizer.

Examples of preferred protective colloids or emulsifiers for finely divided synthetic resins, ie. polymer particles having acidic groups, are polyamide-amines (eg. ®Euretek brands from Schering), polyaminoimidazolines (e.g. ®Euredur 350, Euredur 370 or Euredur 460 from Schering), polyetherurethane-amines (eg. epoxide hardener XE 70 from Schering), polyethyleneimines (eg. ®Polymin brands from BASP Attiengesellschaft) and stearylamine.

TABLE

EURETAK ®505
is a modified polyaminoamide having a viscosity at 75° C. of 1–1.5 Pa.s and an amine number of 380–410, EUREDUR ®350
is a polyaminoimidazoline having a viscosity at 25° C. of 0.15–0.50 Pa.s and an amine number of 350–400, and is further described as an aminoamide or aminoimidazoline-resin prepared from monomeric fatty acids and polyamines.

EUREDUR 460
is a modified polyaminoimidazoline having a viscosity at 25° C. of 3–6 Pa.s and an amine number of 230.260, and EUREDUR XE 70
is a polyetherurethanamine having a viscosity at 25° C. of ca. 20 Pa.s and an amine number of about 70, EURETEK and EUREDUR are brand names of Schering A.G., Bergkamen, Germany.

®EMU-Pulver 120 FD
is a copolymer of styrene, acrylonitrile and acrylic acid having a softening point (according to DIN 53 180) of about 120° C. and an acid number of 8–12, has a particle size of from 1 to 15 micrometer and consists of a copolymer of styrene/acrylonitrile/acrylic acid in the ratio of 80:15:5.

POLYMIN ®
is a polyethyleneimine having a viscosity at 20° C. of 17,000–28,000 mPa.s.

EMU-Pulver 120 FD and Polymin are brand names of BASF Aktiengesellschaft, Ludwigshafen/Rhein.

Examples of preferred protective colloids or emulifiers for polymer particles having basic groups are polyacrylic acid, copolymers of acrylates or methacrylates with acrylic acid or methacrylic acid, oils which have terminal acidic groups and are obtained by reaction of unsaturated natural oils, such as linseed oil, with maleic anhydride, followed by opening of the anhydride with an alcohol or water, and stearic acid.

Examples of preferred protective colloids or emulsifiers which are active for both basic and acidic polymer particles are polymers which have terminal isocyanate groups and are obtained by, for example, reaction of a polyol with an excess of a diisocyanate, and stearyl isocyanate.

The choice of protective colloids is not restricted to those mentioned above, the latter being intended only to illustrate the invention.

In addition to the novel components of the plastisols or organosols, ie. synthetic resin particles, reactive and inert plasticizers, protective colloids or emulsifiers and, in the case of organosols, also solvents, if necessary assistants can be added, e.g. viscosity regulators, sedimentation retardants, flow improvers, scents, wetting agents, extenders and other assistants conventionally used in coating and plastisol technology. Organic and-/or inorganic pigments and fillers, and soluble dyes, can, if desired, also be added.

The plastisols according to the invention have a very wide range of uses. Typical examples of uses are the coating of textile fabrics for tarpaulins and clothing materials, where the better light-stability of the acrylates compared with PVC is particularly advantageous, and as seals for crown caps, antidrumming materials, automotive undersealants hving particularly low baking temperatures, and joint sealants and adhesives in automotive construction, and for the manufacture of shaped articles, in particular the production of toys by the rotational coating or dip coating method, and of imitation leather, and many other uses.

The plastisols prepared according to the invention are processed by the conventional plastisol technology.

The Examples which follow illustrate the invention and demonstrate its usefulness in practice, without restricting it to the stated substances, procedures and uses.

In the Examples which follow, parts and percentages are by weight, unless stated otherwise.

PIGMENT PASTE A 20.35 parts of titanium dioxide in the anatase form,
20.35 parts of finely divided pigment chalk,
2.8 parts of iron oxide yellow and
56.5 parts of dioctyl phthalate are milled in a stirred ball mill to a particle size of <20 μm.

PIGMENT PASTE B 50 parts of titanium dioxide in the rutile form,
47.5 parts of dioctyl phthalate,
2 parts of zeolite powder and
0.5 part of 2,4,7,9-tetramethyl-dec-5-yne-4,7-diol are milled in a stirred ball mill to a particle size of <10 μm.

EXAMPLE 1

36.1 parts of a commercial carboxyl-containing copolymer powder which is based on acrylonitrile and styrene and has an acid number of 38.8 (eg. ®EMU-Pulver 120 FD from BASF), 42.4 parts of dioctyl phthalate, 0.75 part of polyamidoamine (eg. Euretek 505 from Schering) and 20.75 parts of pigment paste A are mixed, with thorough stirring, and the mixture is then dispersed using a high-speed surface coating dissolver. The temperature is kept at not more than 25° C. by cooling, and coarse particles are removed by filtration over a 100 μm edge filter. A free-flowing paste is obtained.

COMPARATIVE EXAMPLE 1

The procedure described in Example 1 is followed, except that the polyamidoamine is not added. A free-flowing paste is obtained.

COMPARATIVE TEST OF EXAMPLE 1 AND COMPARATIVE EXAMPLE 1

A. FILM FORMATION

The pastes from Example 1 and Comparative Example 1 are applied, using a 1,000 μm knife coater, onto metal sheets primed with an electrocoating finish. The sheets are then stored for 20 minutes at 110° C., after which they are cooled to room temperature. The resulting films are resilient and flexible, exhibit good adhesion and can be used, for example, as antidrumming materials, sealants or protective coatings against stones in automotive construction.

B. SHELF LIFE

| Paste from Example | Shelf life at 23° C. | |
|---|---|---|
| | after 3 days | after 3 weeks |
| 1 | unchanged | unchanged |
| Comparative Example 1 | pronounced thickening, difficult to stir | converted to a solid mass |

100 parts of the copolymer powder from Example 1, 1 part of the polyamidoamine as in Example 1, as a protective colloid, and 60 parts of dioctyl phthalate are dispersed at not more than 25° C. using a dissolver, after which 44 parts of pigment paste B are stirred in. A white viscous paste is obtained.

COMPARATIVE EXAMPLE 2

The procedure described in Example 2 is followed, except that the protective colloid is not added.

COMPARATIVE TEST OF EXAMPLE 2 AND COMPARATIVE EXAMPLE 2

A. FILM FORMATION

Test pieces of a cotton fabric are attached on metal sheets using thermally stable adhesive tape. The pastes from Example 2 and Comparative Example 2 are then applied with a 200 μm knife coater, and the sheets with the attached and coated cotton fabric test pieces are stored for 10 minutes at 140° C. After cooling to room temperature, the pieces of cotton fabric are detached from the metal sheet. They are water-tight, non-tacky and flexible.

Cotton fabrics treated in this manner would be suitable, for example, for the manufacture of hoses, weatherproof clothing or tents.

B. SHELF LIFE

| Paste from Example | Shelf life at 23° C. | |
|---|---|---|
| | after 3 days | after 2 weeks |
| 2 | unchanged | slightly thickened |
| Comparative Example 2 | sharp increase in viscosity, can no longer be applied with a knife coater | converted to a solid mass |

We claim:

1. A process for the preparation of a plastisol having a shelf life of more than three days at room temperature which comprises: mixing (1) a finely divided synthetic resin which contains acidic groups and has an acid number of not less than 5 and is selected from the group comprising a copolymer of acrylate or methacrylate compounds and a vinyl ester copolymer and has a particle size of from 0.05 to 500 μm and (2) a plasticizer, to form a dispersion, and adding to said dispersion a dispersion stabilizer, said dispersion stabilizer being an inert or reactive basic protective colloid or basic emulsifier or a mixture thereof, said basic protective colloid being at least one substance selected from the group consisting of polyamide-amine, polyamino-imidazoline, polyetherurethane-amine and polyethyleneimine, which displays a phase-separating surfactant activity between the continuous and the discontinuous phase of a dispersion and said basic emulsifier being a compound which occupies the surface of the disperse phases, said compound being stearylamine, whereby the shelf life of the dispersion at room temperature is increased to more than three days.

2. The process of claim 1, wherein the finely divided synthetic resin used is a copolymer of acrylate or methacrylate compounds which predominantly consists of copolymerized units of acrylates, methacrylates or acrylonitrile, or a mixture of acrylates or methacrylates with acrylonitrile.

3. The process of claim 1, wherein the finely divided synthetic resin used is a mixture of acrylate or methacrylate copolymers and vinyl ester copolymers, the finely divided synthetic resin alone, without the addition of a dispersion stabilizer, forming together with the plasticizer a dispersion which is unstable or has only a short shelf life of less than three days at room temperature.

4. The process of claim 2, wherein said acrylate and methacrylate compounds are partially replaced by vinylaromatics and minor amounts of other olefinically unsaturated monomers which are copolymerizable with acrylates and methacrylates.

5. The process of claim 1 wherein said dispersion contains pigments, fillers, volatile solvents and other assistants.

6. The process of claim 1, wherein the acidic groups are carboxyl groups.

* * * * *